| United States Patent [19] | [11] Patent Number: 4,699,817 |
|---|---|
| Fujiki et al. | [45] Date of Patent: Oct. 13, 1987 |

[54] MAGNETIC RECORDING MEDIUM

[75] Inventors: Kuniharu Fujiki; Ikuo Matsumoto, both of Mito, Japan

[73] Assignee: Victor Company of Japan, Ltd., Japan

[21] Appl. No.: 856,787

[22] Filed: Apr. 28, 1986

[30] Foreign Application Priority Data

May 1, 1985 [JP] Japan .................................. 60-92348

[51] Int. Cl.⁴ .............................................. G11B 5/702
[52] U.S. Cl. ................................... 428/64; 252/62.54; 427/128; 428/65; 428/425.9; 428/480; 428/694; 428/695; 428/900
[58] Field of Search ............ 428/694, 695, 900, 425.9, 428/480, 64, 65; 427/128; 252/62.54; 360/134–136

[56] References Cited

U.S. PATENT DOCUMENTS

| 3,574,684 | 4/1971 | Higashi | 252/62.54 |
| 3,833,412 | 9/1974 | Akashi | 252/62.54 |
| 4,154,895 | 5/1979 | Ogawa | 252/62.54 |
| 4,389,458 | 6/1983 | Hosaka | 428/695 |
| 4,409,291 | 10/1983 | Ogawa | 428/694 |

FOREIGN PATENT DOCUMENTS

| 44-18221 | 8/1969 | Japan . |
| 55-1636 | 1/1980 | Japan . |

*Primary Examiner*—Ellis P. Robinson
*Attorney, Agent, or Firm*—Lowe, Price, LeBlanc, Becker & Shur

[57] ABSTRACT

Magnetic recording mediums comprising a nonmagnetic substrate and a magnetic recording layer formed on at least one side of the substrate. The magnetic recording layer is made of a composition which comprises magnetic particles dispersed in a combination of polyester and polyurethane resins and oleic acid, so that the magnetic medium is significantly improved in durability and lubricating property.

5 Claims, No Drawings

MAGNETIC RECORDING MEDIUM

BACKGROUND OF THE INVENTION

Field of the Invention

This invention relates to magnetic recording mediums in the form of tapes, disks or the like.

Description of the Prior Art

Since magnetic recording mediums such as magnetic tapes and disks are repeatedly used for recording and reproducing operations, it is important that the magnetic recording layer be tough or resistant to wear and have a good lubricating property without suffering defects on the surface thereof on repeated use.

Although magnetic disks do not run as is different from the case of magnetic tapes and do not thus frictionally contact guide pins as with magnetic tapes, the disks are invariably in direct contact with liners provided within a jacket case. Accordingly, the magnetic recording layer of the disk should have good durability and a high lubricating property similar to magnetic tapes. In addition, magnetic disks should satisfy requirements which are contrary to each other, i.e. not only should the disk have a good lubricating effect on a magnetic head, but also migration, on the liners, of the lubricant which is present on the surface of the magnetic layer should be suppressed to a minimum. In order to satisfy the above requirements, Japanese Patent Publication No. 44-18221 proposed a magnetic recording tape which comprises fatty acids or esters thereof in a magnetic recording layer. More particularly, fatty acids incorporated in the magnetic recording layer are used to suppress a squeaking phenomenon as will occur during the recording or reproducing operation of the tape. On the other hand, fatty acid esters are stated to improve the wear resistance of the magnetic medium when incorporated in the magnetic recording layer.

Japanese Laid-open Patent Application No. 55-1636 describes a magnetic recording medium in which liquid paraffin and a phthalic ester are contained in the magnetic recording layer so as to improve the wear resistance of the magnetic layer.

Up to now, techniques developed with respect to the magnetic tapes have simply been applied to fabrication of the disks. For instance, there has been proposed a magnetic disk in which mixtures of fatty acid esters, liquid paraffin and oleic acid are incorporated in the magnetic layer.

On the other hand, ordinary binders which are another main component for the magnetic layer of magnetic tapes and disks are those resins including, for example, nitro cellulose, polyvinylidene chloride, vinyl chloride-vinyl acetate-vinyl alcohol copolymers, styrene-butadiene copolymers, polymethyl methacrylate, polyurethane, epoxy resins, polyesters, butadiene-acrylonitrile copolymers and the like.

In prior art, these lubricants and binders were studied separately, not in combination. For instance, polyester resins are frequently used as a binder for the magnetic recording layer and are employed in combination with various types of lubricants such as higher fatty acids, higher fatty acid esters, liquid paraffin, and dimethyl silicones. However, these combinations do not show satisfactory wear resistance and durability characteristics. In some cases, a bleeding phenomenon takes place violently or the durability with time bcomes poor. On the contrary, some lubricants have good miscibility with the polyester resin, with a disadvantage in that the resulting magnetic layer is considerably plasticized.

SUMMARY OF THE INVENTION

It is accordingly an object of the present invention to provide magnetic recording mediums whose magnetic layer has a high wear resistance and a good lubricating property without involving any undesirable bleeding phenomenon.

It is another object of the invention to provide magnetic recording mediums in which a magnetic recording layer comprises a specific combination of binders and a lubricant whereby the magnetic layer becomes resistant to wear and has a suitable degree of lubrication.

The present invention is characterized by a combination of polyester and polyurethane resin binders and an oleic acid lubricant, which is used as a magnetic recording layer along with magnetic powders. The weight ratio of polyester and polyurethane resins is in the range of 60:40 to 95:5, preferably 80:20 to 90:10. The resin binder is generally used in an amount of 15 to 40 parts by weight per 100 parts by weight of a magnetic powder. Oleic acid is generally used in an amount ranging from 2 to 10 parts by weight per 100 parts by weight of a magnetic powder.

DETAILED DESCRIPTION AND EMBODIMENTS OF THE INVENTION

The magnetic recording medium of the present invention comprises a non-magnetic substrate and a magnetic recording layer formed on at least one side of the substrate. The magnetic recording layer is made of a composition which comprises magnetic particles dispersed throughout a combination of polyester and polyurethane resins and an oleic acid lubricant.

Magnetic particles used in the present invention may be those particles ordinarily used for these purposes and include, for example, ferromagnetic iron oxides such as $\gamma$-$Fe_2O_3$ and $Fe_3O_4$ with or without additional metals such as Co, Ni, Mn and the like, ferromagnetic metals such as Fe, Co Ni and the like, and alloys thereof. These alloys may further include additional metals such as Al, Cr, Mn, Cu and the like. Other ferromagnetic materials such as $CrO_2$ may also be used. The magnetic particles have generally a size of 0.2 to 0.8 $\mu$m.

The polyester resin used as one of the binders according to the invention has generally a molecular weight of 15,000 to 30,000 and may comprise any known polyester resins. Preferably, polyester resins obtained from polyhydric alcohols such as ethylene glycol, neopentyl glycol, and the like and polybasic acids such as terephthalic acid, isophthalic acid, adipic acid, sebacic acid, and the like are used. Most preferably, polyesters obtained from phthalic acids and ethylene glycol are used.

Likewise, the polyurethane resin has a molecular weight of from 5,000 to 30,000 and may comprise any known polyurethane resins used for these purposes. Specific examples of the polyurethane include those resins obtained from diisocyanates such as hexamethylene diisocyanate, tolylene diisocyante (TDI), diphenylmethane diisocyanate (MDI), isophorone diisocyanate (IPDI), and the like and polyols such as polycaprolactone, polyethylene adipate, polybutylene adipate, polyhexamethylene adipate, polyoxymethylene diol, polyoxypropylene diol, and the like. Preferable resins are those obtained from MDI and polybutylene adipate.

The polyester and polyurethane resins are mixed at a ratio by weight of 60:40 to 95:5, preferably 80:20 to 90:10. The resin binder is used in an amount of from 15 to 40 parts by weight per 100 parts by weight of the magnetic particles.

We have found that when the binder of these resins is used in combination with oleic acid serving as a lubricant, the resulting magnetic layer has a very high wear resistance or durability and a good lubricating property. Oleic acid is used in an amount of from 2 to 10 parts by weight per 100 parts by weight of the magnetic particles. Less amounts are unfavorable because of the lower lubricating effect. Larger amounts may result in bleeding of the lubricant. Preferably, the amount ranges from 3 to 5 parts by weight per 100 parts by weight of the magnetic particles.

In addition to these essential ingredients, other additives may be added to the magnetic recording layer and include, for example, carbon black, dispersion stabilizers, other lubricants, surface active agents and the like in amounts not impeding the properties of the essential ingredients.

The substrate may be made of a variety of materials in the form of films, foils, sheets, and the like. Examples of the materials include synthetic or semi-synthetic resins such as polyesters, polyolefins, cellulose derivatives, and the like, metals such as aluminum, copper, and the like, glasses, ceramics and the like.

The magnetic recording medium of the invention is made by a usual manner. For example, magnetic particles are dispersed in a resin binder and oleic acid dissolved in solvents. The resulting dispersion is applied onto a substrate and cured to form a magnetic layer on the substrate. Solvents for the polyester and polyurethane resins are alcohols such as methanol, ethanol and the like, aromatic compounds such as xylene, toluene, benzene and the like, ketones such as acetone, methyl ethyl ketone, methyl isobutyl ketone and the like, tetrahydrofuran, dimethylformamide, ethyl acetate, and mixtures thereof.

The present invention is more particularly described by way of examples.

EXAMPLE 1

One hundred parts by weight of $\gamma$-$Fe_2O_3$ powder, 27 parts by weight of a polyester resin (Vylon #200, by Toyobo Co., Ltd.), 3 parts by weight of a polyurethane resin (N2304, by Nippon Polyurethane Ind. Co., Ltd.), 1 part by weight of lecithin, 5 parts by weight of carbon black, 10 parts by weight of alumina, 4 parts by weight of oleic acid, and 300 parts by weight of a mixed solvent of toluene, methyl ethyl ketone and methyl isobutyl ketone were mixed and dispersed in a sand mill for about 20 hours. The resulting magnetic paint was applied onto an about 75 μm thick polyester film on opposite sides thereof in a total thickness of about 80 μm on the dry basis. Thereafter, the film was punched to give a magnetic disk having a diameter of about 130 mm.

EXAMPLE 2

The general procedure of Example 1 was repeated except that 18 parts by weight of the polyester resin and 12 parts by weight of the polyurethane resin were used, thereby obtaining magnetic disks.

EXAMPLE 3

The general procedure of Example 1 was repeated except that 28.5 parts by weight of the polyester resin and 1.5 parts by weight of the polyurethane resin were used, thereby obtaining magnetic disks.

EXAMPLE 4

The general procedure of Example 1 was repeated except that 24 parts by weight of the polyester resin and 6 parts by weight of the polyurethane resin were used, thereby obtaining magnetic disks.

COMPARATIVE EXAMPLE 1

The general procedure of Example 1 was repeated except that 30 parts by weight of the polyester resin was used but the polyurethane resin was not used.

COMPARATIVE EXAMPLE 2

The general procedure of Example 2 was used except that 2 parts by weight of liquid paraffin and 2 parts by weight of dioctyl phthalate were used instead of oleic acid, thereby obtaining magnetic disks.

COMPARATIVE EXAMPLE 3

The general procedure of Example 2 was repeated except that n-butyl stearate was used instead of oleic acid, thereby obtaining magnetic disks.

COMPARATIVE EXAMPLE 4

The general procedure of Example 2 was repeated except that the polyester resin was used in an amount of 12 parts by weight and 18 parts by weight of vinyl chloride-vinyl acetate-vinyl alcohol copolymer (VAGH, by U.C.C. of U.S.A.) were used instead of the polyurethane resin, thereby obtaining magnetic disks.

COMPARATIVE EXAMPLE 5

The general procedure of Example 2 was repeated except that 12 parts by weight of the polyester were used, 18 parts by weight of vinyl chloride-vinyl acetate-vinyl alcohol copolymer (VAGH, by U.C.C. of U.S.A.) were used instead of the polyurethane resin, and 2 parts by weight of liquid paraffin and 2 parts by weight of dioctyl phthalate were used instead of oleic acid, thereby obtaining magnetic disks.

COMPARATIVE EXAMPLE 6

The general procedure of Example 2 was repeated except that 6 parts by weight of the polyester resin were used and 24 parts by weight of acrylonitrile-vinylidene chloride copolymer (Saran F 310, by Asahi Dow Co., Ltd) were used instead of the polyurethane resin, thereby obtaining magnetic disks.

COMPARATIVE EXAMPLE 7

The general procedure of Example 2 was repeated except that 18 parts by weight of VAGH were used instead of the polyester resin, thereby obtaining magnetic disks.

The magnetic disks obtained in the Examples and Comparative Examples were each mounted in a magnetic disk apparatus to determine a durability and an accelerated durability. The accelerated durability was determined under conditions of a magnetic head pressure of 60 g and the number of revolutions of 600 r.p.m., and represented as a time before the output power lowered to 10% of the initial power.

The results are shown in the Table below.

|  | Durability (Number of Passes) | | Accelerated Durability |
|---|---|---|---|
|  | at 5° C. | at 51.5° C. | at 20° C. |
| Ex. 1 | over 10 millions | over 10 millions | over 120 min. |
| 2 | over 10 millions | over 10 millions | " |
| 3 | over 10 millions | over 10 millions | " |
| 4 | over 10 millions | over 10 millions | " |
| Comp. Ex. 1 | over 10 millions | 2 millions | " |
| 2 | over 10 millions | over 10 millions | 80 min. |
| 3 | over 10 millions | 8 millions | 100 min. |
| 4 | 5 millions | 5 millions | 90 min. |
| 5 | " | 4 millions | 30 min. |
| 6 | 8 millions | over 10 millions | 30 min. |
| 7 | 5 millions | 1 million | 30 min. |

As will be seen from the above table, the magnetic disks of the present invention have better durabilities over a wide range of temperature than the mediums of the Comparative examples and have thus highly wear-resistant magnetic layers. This is considered to result from the combination of polyester and polyurethane resins and oleic acid.

What is claimed is:

1. A magnetic recording medium which comprises a non-magnetic substrate and a magnetic recording layer formed on at least one side of said substrate, said magnetic recording layer being made of a composition which comprises magnetic particles dispersed in a binder consisting essentially of a blend of a polyester resin having a molecular weight of from 15,000 to 30,000 and a polyurethane resin having a molecular weight of from 5000 to 30,000 and oleic acid serving as a lubricant, said polyester and polyurethane resins having a mixing ratio by weight of 60:40 to 95:5 and being used in an amount of 15 to 40 parts by weight per 100 parts by weight of said magnetic particles, said oleic acid being used in an amount of from 2 to 10 parts by weight per 100 parts by weight of said magnetic particles.

2. A magnetic recording medium according to claim 1, wherein said polyester resin is a polymer of phthalic acid and ethylene glycol and said polyurethane resin is a polymer of diphenylmethane diisocyanate and polybutylene adipate.

3. A magnetic recording medium according to claim 1, wherein the weight ratio of the polyester and polyurethane resins is in the range of 80:20 to 90:10.

4. A magnetic recording medium according to claim 1, wherein the amount of oleic acid is in the range of 3 to 5 parts by weight per 100 parts by weight of said magnetic particles.

5. A magnetic recording medium according to claim 1, wherein said medium is a magnetic disk.

* * * * *